April 7, 1936.  E. W. WESCOTT  2,036,664
TREATMENT OF LATERITIC ORES
Filed June 30, 1933
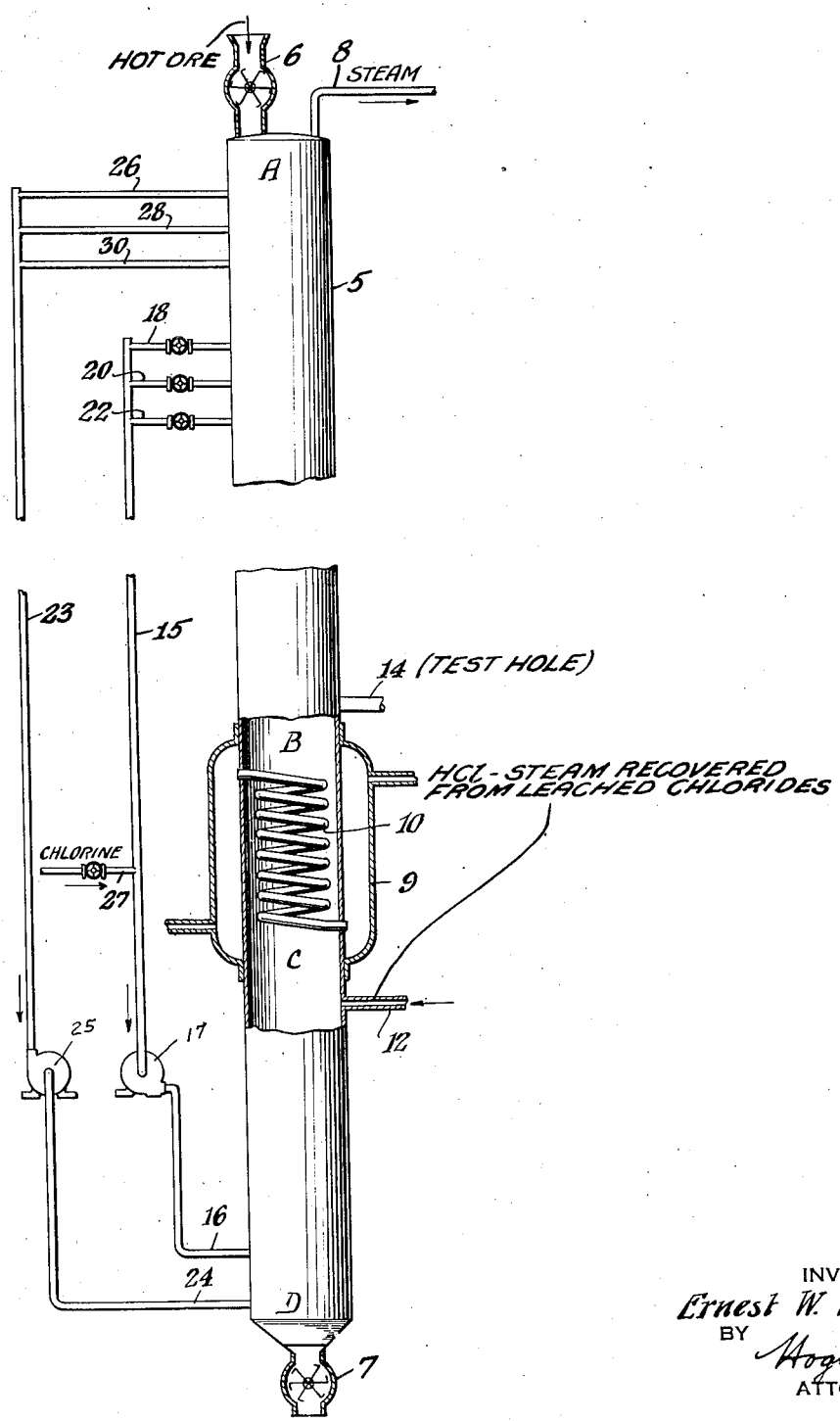
INVENTOR
Ernest W. Wescott
BY
Hoguet & Neary
ATTORNEYS Patented Apr. 7, 1936

2,036,664

UNITED STATES PATENT OFFICE 2,036,664

TREATMENT OF LATERITIC ORES

Ernest W. Wescott, Niagara Falls, N. Y.

Application June 30, 1933, Serial No. 678,381

51 Claims. (Cl. 75—113)

This invention relates to processes for the recovery of nickel from earthy usually hydrated oxide ores containing nickel in small amounts and iron in larger, usually very much larger amounts,—often called lateritic ores—wherein at elevated temperatures the nickel is rendered soluble as nickel chloride by the chloridizing agency of gaseous HCl while the chloridizing of the iron is restrained or inhibited by the agency of gaseous $H_2O$.

Description of lateritic ores

The process of this invention is particularly directed to the treatment of oxide ores containing small amounts of nickel and large amounts of iron,—usually from one to three per cent. of nickel and from thirty to sixty per cent. of iron. The ores in the unaltered natural state are characterized by the presence of much hygroscopic water, that is to say, water driven off by heat at or just above the boiling point of water; and further by the presence of combined water; that is to say, water not evolved by the ore at or just above the boiling point of water. The accepted temperature for determination of the hygroscopic water is 110° C.

The hygroscopic water often approaches 30% and is rarely lower than 20%. The combined water is often as high as 10–13% (on the material freed from hygroscopic water) and rarely less than 7–9%.

Some of the combined water is believed to be present in the form of the mineral goethite, $Fe_2O_3.H_2O$, and some in the form of the various forms of aluminum oxide, (of which the ores often contain considerable percentages) such as diaspore $AlO(OH)$; bauxite $Al_2O(OH)_4$ and hydrargillite $Al(OH)_3$. While most of the metals present appear to be in the form of oxides or hydrated oxides, there are usually small amounts of residual silicates, and combined water is doubtless present as water of composition of these silicates. Typical examples are found in Cuba, Puerto Rico, British West Africa and Dutch East Indies, less typical examples in Greece. Such ores are usually found as residual surface blankets of iron-bearing material and are believed to be derived from underlying basic rocks through tropical or semi-tropical weathering.

The term "lateritic ores" is frequently utilized to designate these ores, and without limiting myself by any theory as to the origin of the ores, I shall use that term to designate the particular class of ore to the treatment of which this invention is addressed.

The hygroscopic moisture of lateritic ores is readily removed in large part by standing in reasonably dry air at ordinary temperatures and is quickly and completely removed at 100°–110° C.

The combined water on the contrary is not quickly and completely removed even at 500° C. A substantial part of the combined water in some samples from Levisa, Cuba, comes off slowly at 250°–275° C.; after 16 hours at 250° a sample showed 3.2% combined water; after 40 hours 2.8%. Twenty minutes at 325° C. decreased the combined water to the same extent as 16 hours at 250°. The evolution of combined water on heating is largely irreversible; on soaking in cold water or otherwise being exposed to water the ore does not recombine with water to any great extent. In some cases I have found 2% of recombination. Different ores evolve their combined water at different rates at the same elevated temperatures. These characteristics of these ores comport with known heat decomposition characteristics of goethite and of hydrated nickel compounds.

The ores consist of a major constituent usually exceeding 60% often exceeding 80% and sometimes exceeding 90% which upon gentle rubbing up in water can be shown to be exceedingly finely divided. This portion will all pass a 200-mesh screen. Often more than half of it will pass a 325-mesh screen; indeed the true grain size of almost all the fine portion is probably finer than 325-mesh. The coarse portion usually contains a few per cent. of particles of chromite and usually substantially smaller percentages of fragments of quartz and serpentine. The remainder of the coarse portion consists of the so-called "shot" ore which is often somewhat poorer in nickel and richer in chromium than the rest of the ore. It is usually lower in hygroscopic water and combined water. The "shot" ore is porous and consists largely of slightly consolidated fine ore, with particles of chromite.

When dried bone dry the ore is notoriously dusty unless heated up to or above incipient clinkering, nodulizing or sintering temperatures.

Prior knowledge

Aqueous solutions of strong acids dissolve both the nickel and the iron in lateritic ores but there is no known wet way of attacking the two substantially differentially, that is, of dissolving the greater part of the nickel—70% to 90%—and but a small part of the iron.

Chloridizing processes have been proposed for nickel-iron ores in general wherein all the iron and nickel were chloridized at elevated temperatures, in some processes with Cl₂ and a reducing agent, in others with pure or nearly pure HCl, and the FeCl₃ volatilized or otherwise separated from the NiCl₂.

Other chloridizing processes have been proposed for treating the nickel-iron ores in general and garnierites—nickel iron silicate ores—in particular, with various metal chlorides; in autoclaves at or below 190° C. with ferric chloride solution; at temperatures around a red heat with salt (NaCl); at intermediate temperatures with magnesium chloride. HCl gas substantially pure has been tried at around 400°–500° C.

Processes have been proposed involving a wide range of chloridizing temperatures—from "normal" up to a red heat—and utilizing ferrous or similar chlorides, often together with HCl or Cl₂ as equivalents of each other, and operating over at least part of the temperature range with wetted and/or progressively re-wetted ore.

Many of these proposals fail to give good yields of nickel. Where good yields of nickel have been possible, it has been necessary in most cases to form iron chloride from all or a large part of the iron of the ore and to handle the iron chloride at least by traversing through mechanical (agitating) furnaces, often to vaporize or dissolve it, and thereafter to work it in some manner. The proposals contain no teaching for the obtaining of high yields of nickel while avoiding the necessity of handling, or of forming from the ore and handling, amounts of iron or other extraneous chlorides large as compared to the nickel chloridized.

These prior processes have been in most cases proposed as applicable without differentiation to oxide ores prepared by calcination.

Objects of the invention

Lateritic ores exist in enormous quantities in favorable locations, and in surface deposits which are cheaply mined with steam shovel or dragline excavators. Near the northeast coast of Cuba, for instance, there are deposits believed to aggregate some billions of tons. These deposits comprise probably the world's greatest nickel reserves, yet they are not ordinarily considered as such, because there has been no sufficiently economical method of nickel extraction.

A chief object of this invention is to provide a highly economical method of extracting nickel from these ores, based in part upon my discoveries of properties somewhat peculiar to them.

More detailed objects include:

The obtaining of high yields of nickel by solubilizing it to the extent of about 90–98% while solubilizing even initially but small percentages of the large amounts of iron present;

Providing for chloridizing operations in cheap stationary reactors, largely or wholly built of iron, eliminating dust nuisance, refractories and capital and operating costs of rotary kilns or mechanical furnaces;

Providing for extreme perfection of gas—solid contact and counterflow conditions, and hence high efficiencies both of reactor volume and of reagent utilization, while eliminating necessity for briquetting, necessity for extraneous binding agents, or of sintering, nodulizing or clinkering;

Making possible the production of highly concentrated leach solutions of nickel without evaporation or use of counter-current mechanically operated apparatus;

Producing nickel solutions, initially low in, or at will substantially free from, iron;

Providing means whereby particularly in virtue of the concentration of the nickel solutions obtained, the contained combined chlorine is economically recoverable as gases suitable for reuse in chloridizing while the nickel is obtained as oxide ready for smelting without necessary extensive use of precipitants for nickel, and in this and other ways providing extreme economy in use of chemicals.

Other objects of my invention will appear further in this specification.

General statement of invention

The process comprises, in general, preparatory treatment of the ore including drying to remove hygroscopic and usually some combined water and preferably, but not necessarily, the formation of the ore into roughly like-sized lumps, and permissibly including classifying operations for the elimination of so-called "shot" ore and concentration of nickel in the material to be treated; chloridizing operations substantially in the dry way at elevated temperatures, wherein large percentages of the nickel present are converted to chloride at temperatures below around 300° C. and usually largely above around 190° C., while relatively small percentages of the iron present are converted to chloride; utilizing the chloridizing power of hydrochloric acid gas and the restraining or inhibiting power of steam, the maximum chloridizing power of the gases being correlated to the temperature; the chloridizing treatment being often but not necessarily followed by treatment with weaker gases (including permissibly oxidizing agents in controlled amounts) and/or at higher temperatures, to destroy chlorides of iron, etc., to sweep out HCl, and in some cases, to make the lumps leachable as such, while protecting NiCl₂ from destruction by maintaining a sufficiency of HCl, and it may be, of Cl₂, in the destroying gases; cooling the chloridized ore and leaching it to yield solutions containing nickel chloride preferably, but not necessarily, by countercurrent leaching with stationary beds of lumps of chloridized ore, to yield concentrated solutions, and thereafter working the solutions for nickel preferably, but not necessarily, through agencies including heat and the hydrolyzing power of water, for the recovery of combined chlorine in the form of mixtures of hydrochloric acid gas and steam suitable for reuse in the chloridizing operation.

Certain of the more important discoveries (a) *Differential chloridizing.*—As is known, strong HCl gas will chloridize the iron content of lateritic ores completely or almost completely. This action has been used analytically, and has been made the basis of processes. I have discovered that the chloridizing effect of HCl on the iron content of these ores can be inhibited or restrained in very large part by the presence of proper amounts of water vapor—gaseous H₂O. In this way I have found it possible to chloridize 90%–98% of the nickel while chloridizing only small percentages of the iron—rarely more than 15% and often under 5%. If too much water vapor is present the chloridizing of the nickel in satisfactory measure is also inhibited. There is, however, a satisfactorily wide range of usable gas compositions throughout the temperature range utilized.

The maximum temperature at which the actual differential chloridizing takes place satisfactorily is, with certain ores, around 275° C. Poorer results are usually obtained around and above 300° C. The differential chloridizing may be initiated at temperatures below around 190°, but attempts to complete the chloridizing of the nickel below that temperature usually result in excessive chloridizing of iron and other disadvantageous results.

To give high yields of nickel, the volume per cent. HCl in the mixtures of HCl gas and water vapor must be brought up to certain strengths—for particular ore and at particular temperatures, etc.—but as I have discovered, most of the HCl taken into combination by the ore constituents can be furnished at lower concentrations. So extreme is this effect that an ore requiring gases containing around 50 volume per cent. HCl to give 92% nickel chloridization at 250° C. is capable at that temperature, when fresh, of stripping HCl completely from very dilute HCl—H2O gases, pure steam passing off. The same ore had its nickel content chloridized to upwards of 40% at that temperature before requiring gases containing over 12 volume per cent. HCl.

(b) *Reactivity.*—I have discovered that the nickel minerals in natural lateritic ores possess ability to react with HCl gas, under preferred circumstances, as later set forth, which is seriously decreased by heating at and above certain temperatures and for times varying somewhat with different ores. The decrease in reactivity appears to be roughly, but only roughly, parallel to the decrease in the combined moisture below the figure attained for the particular ore on long standing at around 190–200° C. Cuban lateritic ores are unharmed by heating for long times at 200° to 225° as regards later treatment at 190°–210°, and but slightly, if at all harmed thereby for later treatment at 250°. But if heated for the shortest time at 550°, or for 10 to 20 minutes at around 325°, or for 20 hours at 250°, yields on treatment at 250° with 50 volume per cent. HCl which on fresh ore would have been 90–94% will drop to around 40–50%, and yields on treatment at 190–210° with 28–33 volume per cent. HCl which would have been 95–98% will usually drop below 75% and often below 50%. The combined water in the damaged ore was found to range from around 2.8% to 4.2% in various cases.

It will be understood that the reactivity I have discovered is a differential one as regards iron: an ability of the nickel minerals to react with HCl gas nearly completely under conditions where the iron minerals present react but little. It is this relative or differential reactivity which is lost by overheating, as above indicated. Absolute reactivity is not lost; the nickel in heat-damaged ore will react completely with sufficiently strong HCl and in sufficient time even at, say 300°—but the iron is then also very largely, even completely, chloridized.

Ore which has been overheated can be treated by a modification of the process, which will be described later, but overheating is strongly advised against and the modified form is best reserved for ores which have been damaged by natural metamorphic processes as is true of some of the Greek lateritic ores.

I urge no hypothesis to account for the phenomenon, which is the more remarkable in that 30–40% of the nickel often retains reactivity after severe heat treatment. Possibly the phenomenon is analogous to that occurring when nickel oxide is roasted and then becomes relatively insoluble in aqueous acids. The nickel mineral in lateritic ores is probably highly dispersed or disseminated and possibly a portion of it is isolated by alumina or other substances from other molecules of nickel mineral with which it could recrystallize or otherwise alter into a denser or otherwise more inert form. Possibly the nickel is present in part as hydrated silicate in which it is "locked up" to varying degrees depending upon its position in the silicate molecule and the degree of dehydration of the silicate.

(c) *Lumps.*—Lateritic ores (unless calcined, etc.) are notoriously dusty in dry process work and notoriously difficult to leach thereafter, requiring the handling of vast volumes of poorly-settling mud. I have discovered that these ores can be formed into lumps in diverse ways without damaging nickel reactivity (as by calcining) or incurring costs and interfering with the chemistry of the process (as by briquetting with organic binders); that these lumps are sufficiently porous to react completely even when as large as ½" diameter and larger; that they are strong enough to withstand reasonably careful handling, and to carry their own weight in deep charges; and, most remarkable of all, that they withstand leaching and do not disintegrate in water, if chloridized as I later direct, thus permitting percolating or "sand" leaching in good counterflow, with high porosity and easy flow through the leaching beds.

Various other discoveries will be set forth further on in the specification.

Preparation of ore

One preferred method of preparing lumps of ore is as follows: The natural ore as mined is disintegrated by passing through toothed rolls and is then fed, together with a supply of dry, powdered ore, into one end of a horizontal rotating steel cylinder, fitted with an annular inwardly projecting rim at the feed end. By controlling the speed of rotation of the cylinder and the supply of powder, the material discharged at the other end of the cylinder can readily be made satisfactorily homogeneous in size. The discharge is screened; in one instance, material finer than ¼ inch and coarser than ⅜ inch was returned to the feed end of the cylinder.

The roughly like-sized lumps between ¼ and ⅜ inch in diameter are then dried upon a dryer similar to a straight line sintering machine but of lighter construction because of the low temperatures involved. The maximum temperature of the hot gases furnished to the wind box of the drier was 210° C. in one case. In order to insure uniformity of drying and preheating, the hot gases were sucked down through the discharge end of the traveling bed of ore and thereafter up through the rest of the body of ore. Twenty-five minutes were required for this drying and preheating operation. The ore discharged from the drying belt was fed directly into a chloridizing reactor. This method of drying fulfills the desirable condition that the drying time and the maximum temperature to which the ore is exposed be under ready control.

In another method of preparation, ore from the mines near Levisa in Cuba was treated. This ore contained 18–20% of particles coarser than 40 mesh and 77% of it was finer than 200 mesh. The material coarser than 40 mesh was in the form of hard rounded lumps often called "shot" ore, and contained less nickel than the fine portions. The natural ore was worked up with water and the "shot" ore was eliminated by known water classification means. Some concentration of nickel in the fines resulted. The pulp of fine ore was dewatered, filtered and the filter cake was dried with low temperature heat. The filter cake was then broken up in known ways to give the maximum of the desired size range, oversize and undersize being returned and mixed into thickened pulp ready for filtration. The roughly like-sized lumps were then given final drying and preheating on a straight line sintering machine type of dryer as previously described.

Definition of certain terms

Hydrochloric acid, HCl, is not the equivalent of elemental chlorine, $Cl_2$, in this specification. HCl may be generated from $Cl_2$ and vice versa in ways known in the art, but only under special circumstances. When $Cl_2$ is specified, it is for a special purpose, entirely different from the purposes for which HCl is used. HCl as such will not perform the functions of $Cl_2$, nor will $Cl_2$ as such perform the functions of HCl, for the purposes of this invention.

Lateritic ores often contain from 6 to 14 lbs. of cobalt for each 100 lbs. of nickel. The reactions and behavior of cobalt are many of them very similar to those of nickel. Nickel containing cobalt is acceptable for many trade purposes. I shall use the term "nickel" in both specification and claims to include the cobalt present, unless and except where the context forbids or where the two are specifically differentiated.

Non-equivalence of HCl and of chlorides, such as $FeCl_3$, $FeCl_2$, etc., as chloridizing agents In the present process, the formation of either ferrous or ferric chloride in the chloridizing is undesirable and, as will be seen, the gas concentrations are controlled as to the ratio of HCl to $H_2O$ to minimize formation of iron chlorides to the extent compatible with the desired degree of solubilizing of nickel. The essential reagents in chloridizing are HCl and $H_2O$ and it is the volume percentages of these gases in the interstices of the ore which determine the course of the chloridizing.

Such metal chlorides are formed and thereafter may be decomposed and yield HCl thus increasing the strength of the gases—an effect which is utilized, under control. But I prefer to minimize particularly the formation of $FeCl_2$. The formation and decomposition of this substance fulfills no useful function, and in general requires special procedures and expense to insure its decomposition, unless ferro-nickel is to be produced.

As I find, ferrous oxide as such cannot exist in significant quantities in the dry ore ready for treatment at operating temperatures. Such $FeCl_2$ as is formed results either from the undesirable action of traces of organic matter not oxidized in drying or from the attack of $Cr_2O_3 \cdot FeO$—chromite—and $Fe_2O_3 \cdot FeO$—magnetite (or their hydrates). Ferrous oxide in these combinations is in general very tightly bound and under the conditions of operation of this specification is less easily attacked by HCl gas than is ferric oxide or goethite.

Oxygen in the drying gases assists in minimizing the formation of $FeCl_2$, possibly by removing organic matter—root débris, etc.

In the drawing, there is shown, in part elevation and part vertical section, a more or less diagrammatic embodiment of one form of apparatus that may be used in carrying out the invention.

The apparatus illustrated consists essentially of a vertical iron pipe 5 closed at both ends, and provided with a feed hopper 6 of conventional gas-sealing type at the upper end with a similarly gas sealed discharge outlet 7 at the lower end. A steam outlet pipe 8 also communicates with the upper end of the reactor thus formed. The reactor is protected from cooling by conventional means. In an intermediate section, from B to C as shown, the reactor is provided with a jacket 9 and an internal heating coil 10. The jacket and coil are provided with a heat-supplying and distributing liquid or vapor from a source not shown. An inlet pipe 12 is provided for leading in HCl and steam gases recovered from nickel chloride leach solutions as later described, such gases being introduced as shown at a suitable point in the zone C—D, where they join the upward stream of gases passing through the reactor. A diffuser, not shown, distributes the gases thus fed into the upward stream. A test aperture 14 is provided at B for withdrawing samples. Other test apertures not shown are provided for withdrawing samples at other points along the reactor. Pipe connections suitably spaced for the purposes hereinafter more fully described are provided for withdrawing gases from different sections of the reactor and introducing them at other zones in the reactor. Two sets of connections are shown. One set consists of the valve-controlled pipe connections 18, 20, 22, communicating with the reactor along an intermediate portion of the section A—B and with a pipe 15 through which gases are drawn by the fan 17, and blown into the reactor at 16. The other set of valve-controlled pipe connections 26, 28, 30, communicates with the reactor still higher along section A—B and with a pipe 23 through which gases are drawn by the fan 25 and blown into the reactor at 24. Chlorine for the purposes hereinafter described may be introduced into pipe 15 through a valve connection 27. The section C—D of the reactor should be made of 18—8 chrome-nickel ferrous alloy or other suitable corrosive-resistant material. For a description of the process as it may be carried out in a reactor of the type above described, reference is made to the description of "Example 4" hereinafter set forth.

It will be understood that the apparatus illustrated is merely one embodiment of apparatus that may be used in carrying out the process. Many other forms of apparatus may be employed, for example, a series of reactors wherein the charge is held stationary and through which the gases are circulated in series or any other desired arrangement consistent with the teachings of the process.

SPECIFIC ILLUSTRATIONS OF PROCESS

Example 1

Lateritic ore from the Bella Maria deposit near Levisa Bay in Cuba in the form of lumps ranging from 0.09" to 0.132" diameter and containing practically no "shot" ore was dried and brought up to temperature in 20 minutes in a rapid stream of hot gases at a maximum temperature of around 275° C. The temperature of the lumps was measured by a shielded thermocouple buried in the mass. The ore as dried contained 49.7% iron, 10.9% alumina, 2.17% chromium, 3.2% silica, 1.57% nickel and 8.7% combined water.

The lumps were placed hot in a vertical iron pipe, being supported upon a screen at the bottom of the pipe. The depth of the charge was about ten times the diameter. The pipe was protected from cooling and was maintained at a temperature in the range of 265 to 275° C. Steam containing initially a bare trace of HCl and coming from other reactor pipes undergoing similar treatment was first passed through the charge of ore. The ore charge showed but slight resistance to the flow of gases. The exit gases consisted of steam free from HCl. Gases progressively richer and richer in HCl were passed in and attained 50—55 volume per cent. of HCl at the end of 40 minutes. When traces of HCl appeared in the exist gases, they were passed into and through a similar charge in another pipe. The full strength gases were blown through the pipe for two hours.

A sample of the chloridized lumps then showed the nickel 90.2% soluble in water as chloride. Of the total iron present only 2.82% was soluble. Of this 2.82%, 1.28% was soluble as ferric chloride and 1.54% as ferrous chloride.

Steam containing about 10 volume per cent. of HCl was then blown through the charge. This treatment lasted 30 minutes. The gases utilized for this treatment were the exit gases from other pipe reactors undergoing treatment. The exit gases from this operation which I denote as a hydrolyzing or chloride-destroying treatment were thereafter passed over relatively fresh ore,— ore which had not theretofore been under the influence of gases as strong as these exit gases from the hydrolyzing treatment.

The nickel in the charge was then of the same per cent. solubility as before. No trace of ferric chloride was found. The ferrous chloride previously found was substantially unchanged. The charge contained some gaseous HCl, which was swept out rapidly with hot oxygen-low flue gases.

The charge was then removed from the reactor,—from which the lumps flowed readily— cooled and leached in countercurrent with water. The solution obtained contained 30.7% of solids. The solids were crystallized out by evaporation and consisted largely of nickel and ferrous chlorides. The ore residue contained 0.07% of combined chlorine.

For each 100 lbs. of nickel in the crystals they contained 53 lbs. of iron. The crystals were placed in a muffle furnace and heated at 550° to 650° C. Air was blown in and brought in good contact with the solids. The solids were converted to nickel oxide and $Fe_2O_3$. The gases passing off contained, by volume, 49% HCl, 42% $H_2O$, slightly over 8% of nitrogen and a fraction of a per cent. of oxygen. These gases were reutilized in chloridizing fresh charges and had about the same effectiveness in chloridizing nickel and inhibiting the chloridizing of iron as a mixture of 52 volume per cent. of HCl and 48 volume per cent. of steam.

The mixed oxides were smelted to ferro-nickel.

*Example 2*

Ore similar to that utilized in Example 1 was dried and brought up to a temperature of 250° C. in a rapid stream of hot gases whose temperature did not exceed 260°. The ore was treated as in Example 1. The maximum strength of HCl was 49 volume per cent., the rest of the gases being steam. After treatment with that strength of gases for two hours a sample was analyzed and the nickel present was 93.5% water soluble as chloride. Of the iron present 4.4% was soluble as ferric chloride and 2.1% as ferrous chloride. A small amount of aluminum was present as chloride. The chloridized ore was then treated with dilute gases as in Example 1, for 30 minutes. The nickel solubility was then found to be 93.2%—substantially unchanged, the difference being believed due to the difficulty of accurate sampling. Of the iron present 0.6% was soluble as ferric chloride and 2.2% as ferrous chloride. A trace of aluminum was still found soluble. Upon cooling and leaching as in Example 1 strong solutions were obtained. Most of the combined chlorine in the solution was recovered as HCl—$H_2O$ gases and reutilized in chloridizing. The solutions contained more iron in proportion to the nickel than was to be expected from the analysis of the sample. This appeared to be due at least in part to HCl held as such in the ore, which dissolved in the leach solution and which attacked the ore to some slight extent when the solution became concentrated or possibly due to the action in strong solution of aluminum chlorides or oxy-chlorides. In one operation, this residual HCl was decreased by ventilation; in another, by brief application of a vacuum, which may be regarded as a form of ventilation.

While I have illustrated operations at 250° and 270° with stationary charges of ore, I usually prefer in operation at these temperatures to work with a continuous or nearly continuous downward flow of ore and discharge of chloridized material, as so doing decreases the risk of damage to ore standing in the reactor and awaiting treatment.

At around 250–275° the evolution of combined water from the ore during chloridizing dilutes the acid gases, and particular care must be used to see that the gases are actually up to strength in the ore mass.

*Example 3*

This example gives several illustrations of the deleterious results of heating a particular sample of ore at too long times and/or at too high temperatures prior to chloridizing at around 250° C. In each illustration the ore and the procedure was as in Example 2 except for the drying and preheating operation.

Sample A was heated in steam at 250° C. until the combined water content dropped to 6.5%. The nickel solubility resulting from the stated chloridizing treatment was 69%.

Sample B was heated at 250° C. until the combined water dropped to 3.7%. After the stated chloridizing treatment the nickel solubility was found to be 44.5%.

Sample C was heated to 250° in vacuo until the combined water dropped to 4.29%. The nickel solubility was found to be 56.4%.

Sample D was heated at 550° just long enough to make sure that the ore actually attained that temperature. The combined water was around 1%. The nickel solubility found after the stated chloridizing as before was 35.2%.

*Example 4*

A certain lot of lateritic ore was formed into lumps ¼″ to ⅜″ diameter and dried in a rapid current of waste flue gases containing much oxygen. The maximum temperature of the drying gases was 220° C. The ore then contained 52.3% iron, 1.78% nickel, 0.13% cobalt and 10.03% combined water.

The hot ore is fed directly into the top of the reactor at A, and there meets an outward flowing current of steam going to waste. The column of ore filling the reactor descends slowly as drawn off below. In descending to point B the ore rises in temperature to around 195°–210°. The gas stream becomes progressively richer in HCl and contains about 28–33 volume per cent. HCl at point B. At a point in the reactor where the ore has been exposed to 20 volume per cent. HCl, the nickel solubility is 56 per cent. when exposed to 25 volume per cent. HCl, the nickel solubility is 89%. After exposure to 28 volume per cent. HCl the nickel solubility is 95.8%. At this stage 4.92% of the total iron is present as ferric chloride and 0.89% of it is present as ferrous chloride. The chloridized ore contains 0.51% of chlorine insoluble in water, largely due to the presence of ferric oxychloride, FeOCl. Under one per cent. of the total iron is in this form. A sample withdrawn through the test aperture at B and washed with water breaks up into a mud.

In the section from B to C the temperature of the ore is raised to 270°–290° C. Samples of ore withdrawn in the vicinity of the inlet pipe 12 show no ferric chloride and ferric oxychloride absent or in uncertain traces. Water insoluble chlorine is under 0.1%. Nickel and ferrous chloride are unchanged as compared to the sample withdrawn at 14.

At 16, gases drawn as desired from valve-controlled pipe connections 18, 20, 22 are blown in by fan 17. Connections are changed when necessary so that these gases contain 8–12 volume per cent. HCl. With them is blown in elemental chlorine in small amounts, controlled so that chlorine in the upward stream disappears at around inlet 12. At 24 gases are blown in as desired from the second set of valve-controlled connections 26, 28, 30, adjusted so that the HCl volume per cent. is around 2%. The volumes of gases fed at 12, 16 and 24 are adjusted so that the rising gases at B are around 28 volume per cent. The ore is withdrawn at D through the gas sealing gate 7. Analyses of samples show nickel chloride the same as at B, ferric chloride absent. Ferrous chloride is present in traces.

The ore will contain HCl—some held in the porosities of and interstices between lumps, some perhaps held in other and unknown ways. Flue gas low in oxygen is blown rapidly through the ore lumps for a few minutes in a separate container thus sweeping out this HCl. The ventilating gases are passed over fresh ore destined to be fed into the reactor at A and the small amount of HCl gas is absorbed by the ore.

The lumps are then leached by countercurrent percolating water. They do not disintegrate. The leaching is done in a series of concrete tanks with false bottoms, the solution being pumped from one tank to another. Solutions as obtained have contained 34.7% solids.

In a laboratory test under conditions simulating those above described, with an ore substantially free from manganese and from calcium and magnesium, for each 100 lbs. of nickel there was found 7.98 lbs. cobalt and 1.52 lbs. iron. A portion of the solution was drawn off from the rest. The iron in this portion was oxidized with calcium hypochlorite and the metals in this portion then all precipitated as carbonates and hydroxides in known manner. The precipitate was washed, and added to the main bulk of solution. Chlorine, $Cl_2$, with a minute trace of bromine, was then blown in and the solution agitated. All the iron and cobalt in solution were precipitated, the iron as ferric hydroxide and the cobalt as cobaltic oxide or hydroxide. The precipitate was granular and easy to filter. It contained some basic nickel carbonate, which was removed by agitation with fresh leach solution destined to similar purification. The precipitate was washed, and the washings used to prepare mixed carbonates and hydroxides for use as precipitant in further batches. The precipitate contained only iron, cobalt and small amounts of $Al(OH)_3$—and was commercially nickel-free. It was smelted to ferro-cobalt the $Al_2O_3$ being slagged off. Another lot was refined to pure cobalt oxide by known methods.

The solution now containing no cobalt or iron, but slightly diluted, and uncontaminated with NaCl, $CaCl_2$, etc., as it would have been if it had been treated in usual ways, was then evaporated and nickel chloride crystallized out. The hydrated crystals were calcined at a low red heat in the absence of air. Nickel oxide and a mixture of HCl and $H_2O$ gases were produced. The gases were fed back to the reactor. Part of the nickel oxide was smelted to metallic nickel, and part was used in manufacturing nickel chromium alloys.

*Example 5*

This example gives several illustrations of the effect of stronger acids than necessary or desirable.

A. In one test, nickel solubility of 92.6% was attained by chloridizing for two hours at 250° C. with 60 volume per cent. HCl. The chloridized ore contained 1.64% iron as ferric chloride, 1.86% iron as ferrous chloride and only a trace of FeOCl. This was reasonably satisfactory as shown by other tests but less iron would have been chloridized with somewhat weaker acids and nickel solubility would have been as good.

B. In another test 90–95% HCl was used at 250°. Nickel solubility was only 58% after two hours. (The sample had had its combined water reduced to 3.8% before chloridizing.) The chloridized ore contained 20.3% FeOCl. Thirty-four per cent. of the total iron was chloridized.

C. With strong HCl (90 to 100%) at 225°, in two hours, on fresh ore, 40% of the iron was chloridized.

D. Operation at 270° with 70–74 volume per cent. HCl gave nickel solubility substantially the same as in Example 1—89.7%. But the iron chloride increased, and was 6.8% as compared to the 2.82% found in that example.

E. In another test showing the bad effects of stronger acid than necessary, 38 volume per cent. acid was used at 190–200° C. Nickel was 93% soluble. Twenty-seven per cent of the total iron was chloridized.

F. Ore was chloridized for four hours at 200–210° C. with 50 volume per cent. HCl. The nickel was wholly chloridized, and the iron 85% chloridized. Of the iron present, 46% was as $FeCl_3$, 6% as $FeCl_2$ and 33% as FeOCl.

*Example 6*

This example illustrates the effects of gases of insufficient chloridizing power.

A. Acid gases containing about 10–12 volume per cent. HCl with the balance steam were passed over samples of ore (with reactivity undiminished) at various temperatures and for various times with the following results:

| Time | 2 hrs. | 44 hrs. |
|---|---|---|
| Temperature | 225° | 225° |
| Per cent Ni soluble | 52 | 54 |

B. Similar operations were carried out inter alia with 20 volume per cent. acid, with the following results:

| Time | 4 hrs. | 20 hrs. |
|---|---|---|
| Temperature | 190–200° C. | 190–200° C. |
| Per cent Ni soluble | 44 | 64 |

If the gases are not strong enough to chloridize the nickel satisfactorily in a few hours, long continued chloridizing with the same strength gases will not greatly improve the results, in the temperature range where the attack is satisfactorily differential as between nickel and iron.

*Chloridizing below around 190°*

Chloridizing at temperatures appreciably below 190° tends towards excessive attack of iron; the differential character of the chloridizing effect of HCl—H₂O vapor mixtures is progressively decreased as the temperature is lowered merging finally into the essentially non-differential effect of aqueous solutions of HCl. This observation applies particularly to HCl—H₂O ratios capable of producing good nickel solubilities and with times necessary for that result. The loss of the differential effect is somewhat decreased by the presence of large amounts of other gases than HCl and H₂O, e. g., nitrogen.

In one case, in one hour and 30 minutes in a reactor tube held at a temperature of 135°, 28 volume per cent. HCl produced only 57.9% nickel solubility while 53.4% of the iron present was chloridized—a most undesirable result. The lumps of ore became wet.

Prolonged treatment—20 hrs.—with 14 volume per cent. HCl in a reactor tube held at 180° C. gave only 72.6% nickel solubility, and 52% iron solubility. The lumps of ore became wet although only after 12 hours treatment.

In the range below around 190°, long continued chloridization with HCl—H₂O gases ultimately results in condensation of water and in such quantity that the lumps become soft and pasty, then consisting of a mere skeleton or sponge of ore residue impregnated with saturated ferric chloride solution. I advise against operations producing this result which I do not consider as comprehended within the term "in the dry way". Brief and transient chloridizing below 190°, with rapidly rising ore temperatures is however sometimes desirable. For instance, with reasonably rapid chloridizing, ore dried at 210° and cooled, e. g., in transit to the reactor to as low as 160–170°, will rise rapidly in temperature to above 190° due to heat of reaction and heat of the gas stream, etc.

With ore which has had the reactivity of its nickel content reduced by heating too long, or at too high temperatures, or by natural causes, such as metamorphic effects, so that unsatisfactory yields are obtained by my more preferred procedures, I often obtain good yields by initiating and carrying on the chloridizing to a considerable extent below 190°. Iron chloridization is then usually substantially more extensive than with preferred procedure. In one case using 52 volume per cent. HCl and an externally vapor-heated reactor, and treating material with combined water reduced to 3.8%, I obtained a nickel solubility of 96.2%. The chloridized ore contained 19% FeOCl. Thirty per cent. of the iron was chloridized. In other cases I have obtained nickel solubilities of 86–93% with 15–20% of the iron chloridized. Operations as just described are expensive and I advise that they should not be resorted to except with ores of low nickel reactivity as mined.

*Effects on heating up chloridized or partly chloridized ore, and on heating up during chloridizing*

When ore chloridized at for instance 190–210° C. is thereafter heated up, in the absence of any externally supplied gases, the combined water progressively released reacts with ferric and aluminum chlorides (not appreciably with ferrous chloride or nickel chloride) and produces HCl. In one case, heating up ore chloridized at around 210°, there were evolved while heating up from 220° to 230° (in process of heating up to higher temperatures) gases containing over 60 volume per cent. HCl. Such gases are undesirably strong for that temperature; they produce FeOCl and increase the undesirable production of ferrous chloride. In one case, heating up to 250°, ferrous iron soluble as chloride increased from 0.64% to 1.16%; in another case heating up to 300° ferrous iron as chloride increased from 0.84% to 4.04%—a most undesirable result. In both cases, the amount of FeOCl in the ore was more than doubled.

It is important when the temperature of the chloridized or partly chloridized ore is raised that this effect be controlled. As has been seen (Example 4), I do this by furnishing HCl—H₂O gases which dilute the gases evolved by the ore lumps down to the desired concentration, or even below it, then restoring concentration by stronger gases from without. This later procedure insures against over chloridizing—increasing unnecessarily the amounts of iron chlorides during the elevation of temperature. I usually prefer to operate in this way, completing the chloridizing of the nickel before elevating the temperature (except as self-elevated during chloridizing by heats of reaction in often somewhat transient degree).

I may, however, utilize the effect which is in substance one of concentrating HCl. I then treat at say 190–210° with gases giving somewhat lower yields than are desired, say 23–25 volume per cent HCl and solubilities of nickel for a particular ore, of around 88–90%. I then raise the temperature, passing limited amounts of the dilute gases derived from the later hydrolyzing or chloride-destroying step, so that as the temperature rises the ore is surrounded with stronger gases, resulting from the mixing of the self-generated HCl with the dilute gases. In this way I have raised the per cent. nickel solubility to 97–98%. The operation requires careful control to avoid increase in ferrous chloride and in FeOCl; when either appears in troublesomely increased quantities, I increase the flow of diluting gases. With large lumps and particularly then with rapid heating up, either by heat of reaction or by external heating, strong HCl gases may be generated inside the lumps and over chloridize ore there before the generated gases can be diluted to the proper strength by the gases flowing around the lumps. This effect can be controlled by using smaller lumps, by increasing gas velocities, and by slowing down the temperature rise.

It will be understood that the effect may be used in conjunction with a continuous slow rise of temperature throughout the chloridization.

*Temperatures in the chloridizing operation*

As has been seen, the chloridizing of the nickel is carried out often wholly and always partly above temperatures around 190° C. The lower limit is set by the excessive formation of other chlorides than that of nickel and by the ultimate wetting of the ore at lower temperatures. The upper limit of operations is usually set partly by fundamental properties of iron chlorides $FeCl_3$ and $FeOCl$ and partly by the character of the particular ore in question. At around 290–310° C. and upwards the nickel in most ores loses ability to react with HCl of desirable strengths so fast as to interfere with operations. High solubilities and yields then require the use of very strong HCl gases difficult to recover from the leach solutions and the use of these strong gases results in excessive iron attack. Excessive iron attack is contributed to at these temperatures by the volatilizing of $FeCl_3$ and even $FeOCl$ in the stream of strong HCl gases. This invention does not contemplate operation with substantial volatilization of the iron content of the ore.

Some ores lose nickel reactivity when standing hot much more rapidly than others; this characteristic is readily detected by a simple test. Ores of extreme heat sensitivity should usually be chloridized at 190–210°; almost always below 235 or 225°.

*Precautions against destroying $NiCl_2$ while destroying $FeCl_3$, etc.*

In order to avoid destroying $NiCl_2$ by the reaction $NiCl_2 + H_2O = NiO + 2HCl$ it is necessary that the steam or $H_2O$—HCl gases dilute in HCl used in destroying $FeCl_3$, etc., contain at least minimum amounts of HCl. The minimum necessary amounts are larger the higher the temperature, and are somewhat variable with different ores. At around 275° C. one volume per cent HCl in steam sometimes suffices when the treatment is very brief; I have decomposed $NiCl_2$ at that temperature with steam containing one volume per cent HCl, and even with 5 volume per cent. HCl when the treatment is prolonged. I find 10 volume per cent. safe even for prolonged treatment.

When other gases than HCl and $H_2O$ are present, such as $Cl_2$ or oxygen to participate in the destruction of $FeCl_2$ (and when oxygen is used, air), the protective effect of HCl on $NiCl_2$ is lessened, and more HCl must be present in proportion to the steam.

Nickel chloride is also susceptible to destruction as I find by oxygen. The effect is usually negligible at around 275–300°, but becomes pronounced at higher temperatures. It can be protected against by the presence of small amounts of $Cl_2$.

It is permissible to heat the chloridized ore to temperatures exceeding those given in the specific illustrations. When so doing even greater precautions should be taken to avoid the destruction of nickel chloride. If air is passed over the ore at high temperatures some elemental chlorine, $Cl_2$, should be present to protect the nickel chloride from oxidation. Cobalt requires still more chlorine to prevent the oxidation of its chloride.

The cost of operation is substantially increased by operating at high temperatures, and I advise against them. There is rarely any justification for operating at temperatures higher than or even as high as 350°; around 275° usually suffices.

As has been seen the use of steam at high temperatures and even at 250–275° alone or mixed with air, requires that some HCl be present to protect the nickel (and cobalt) chlorides from decomposition. At around 350–450° steam, HCl, oxygen and $Cl_2$ participate in a balanced reaction—the Deacon reaction—

$$4HCl + O_2 \rightleftharpoons 2H_2O + 2Cl_2$$

which controls the ratio of the various gases, to an extent depending on the catalytic character of the ore. This fact introduces some difficulty in adjusting independently the $Cl_2$ and HCl concentrations to the levels which will protect the nickel and cobalt chlorides from the oxygen and from the steam. In case nickel (or cobalt) solubility is lost the procedure is to lower the temperature, if possible, until the desired solubility is no longer lost; if at the lowest temperature at which it is desired to operate the solubility is still unsatisfactory the concentration of the protective agents (HCl, $Cl_2$) must be increased or the concentration of oxygen and/or steam decreased, until the desired solubility is retained.

*Use of oxidizing agents during chloridizing operation*

Oxidizing agents—$Cl_2$, or oxygen (air)—may be kept present and be somewhat active during the chloridizing operation, as distinguished from a later $FeCl_2$—destroying operation. I find little, if any, advantage in so doing. If $Cl_2$ is used, the cost of apparatus is increased. Oxygen is most effective at the elevated temperatures suitable for commercially prompt destruction, by $H_2O$ vapor sufficiently dilute in HCl, of all $FeCl_2$—best well over 250° C. and around 275°, as has been indicated.

*Further notes on $FeCl_2$ destruction*

As has been indicated, $FeCl_3$, $AlCl_3$ and $FeOCl$ can always be destroyed, without harming $NiCl_2$, by increasing the $H_2O$ and decreasing the HCl concentrations—for commercial rapidity, best at about 275° C. Ferrous chloride requires an oxidizing agent as well. Oxygen has advantages over chlorine, especially at temperatures where the Deacon process reaction (cited elsewhere) does not take place, in that it permits the use of reactors wholly of iron; with $Cl_2$, the portions exposed to $Cl_2$ are best made of chrome-nickel ferrous alloy. But with oxygen, allowance must be made for the influence of the residual nitrogen in decreasing the activity of HCl and increasing the activity of $H_2O$, as elsewhere explained. To avoid this, I sometimes destroy first most of the $FeCl_3$, $AlCl_3$ and $FeOCl$, and then in a separate gas stream treat with air and HCl—$H_2O$ gases dilute in HCl to destroy the $FeCl_2$, by-passing the exit gases from this step around the main chloridizing and temperature-elevating and hydrolyzing zones and adding these gases to the main stream where it has become weakened in HCl. $AlCl_3$ is not destroyed as perfectly as is $FeCl_3$; at least small amounts of soluble aluminum habitually appear in the leached solution as has been indicated. I am unable to say whether this is due to traces of $AlCl_3$ resisting the effect of steam, or due to the re-formation of $AlCl_3$ on wetting (in the leaching step) by the action of residual small amounts of HCl.

*Effect of pressure, vacuum and other gases than HCl and water vapor*

In most cases I recommend operation at atmospheric pressure. Superatmospheric pressures may be used, but the expense is rarely justified. When operating under superatmospheric pressure, the relative activity of HCl gas is greater, and that of H₂O gas is less than atmospheric pressure. Similarly, operation may be carried on at reduced pressure, but this again is rarely desirable. At reduced pressure, the restraining effect of H₂O gas is relatively increased, and the chloridizing power of HCl gas relatively decreased. Under either sub or superatmospheric pressures, the changes in the activities of the two agents can readily be adjusted for.

The presence of other gases than the two essential ones simulates the effect of reducing the total pressure. This case is often met in practise. When substantial amounts of other gases than HCl and H₂O are present, e. g. N₂, CO₂ (more rarely, O₂, Cl₂) the ratio of HCl to H₂O should be adjusted. More HCl gas should then be present in proportion to the H₂O gas. A good general rule for preliminary adjustment is that the square of the volume per cent of HCl gas in the diluted mixture divided by the volume per cent of H₂O gas in the diluted mixture should equal the square of the volume per cent of HCl gas in a satisfactory undiluted mixture divided by the volume per cent of H₂O gas in that undiluted mixture. More HCl is often required. This computation is rarely necessary; it usually suffices, when changing from pure to diluted gases, to increase the HCl and decrease the H₂O slowly until satisfactory results are obtained. I advise against operating at high dilutions with N₂, CO₂, etc. and regard as an important feature of my invention its provisions which render such dilution unnecessary.

*Adjusting gas strengths—HCl replacement*

Hydrochloric acid gas produced in known ways and used for replacement of losses is usually too strong for use without dilution. The hydrochloric acid containing gases recovered from the calcination of nickel chloride, etc. are also often too strong. It will be appreciated that steam or steam containing some HCl gas is always available in the process for dilution of these feed gases to the proper strength.

In operating the chloridizing step at any particular temperature or within any particular range of temperatures I advise starting with gases of a maximum strength somewhat lower than I believe to be required for the desired yields. For instance 20–22 volume per cent HCl at 190–210° C. or 35 to 40 volume per cent HCl at around 250° (the balance of the gases being H₂O), and then as chloridized ore comes thru available for analysis slowly increasing the HCl content of the gases from time to time which is easily done as for instance by decreasing the feed-back of diluting gases from points farther on in the flow of the chloridizing gases. In this way with a particular ore, apparatus, drying conditions, gas velocities, etc., the optimum gas concentrations are readily adjusted to, and the desired yields of nickel obtained with a maximum differential chloridizing effect, that is to say, a minimum chloridizing of iron.

*Resistance of lumps to disintegrating effect of water as affected by maximum temperature and presence of iron chlorides*

As has been seen properly chloridized lumps chloridized at around 250–275° C. or given a treatment at those temperatures or upwards subsequent to chloridizing did not disintegrate upon leaching. Lumps of ore chloridized at 190–210° usually do disintegrate upon leaching and if it is desired to obtain the benefits of percolating leaching and inexpensive production of strong solutions the lumps must then be heated to higher temperatures. Lumps produced in the range from 210–235° are often sensitive to water especially if very high solubility of nickel has been obtained, as by using somewhat greater strengths of HCl than entirely necessary. Chloridized lumps can always be made resistant to leaching by the described treatments; that is to say, by elevating the temperature and/or destroying extraneous chlorides.

*Drying times and temperature—Variability of ores*

With the ores dealt with in the illustrations, damage to reactivity on standing hot was nil at 150° C., negligible at around 200–225°, slow at around 250° and very rapid at around 300–325°. The damage is rapid at around 325° with all ores I have tested, but the temperature at which loss of reactivity begins on standing hot is variable. I have never found it low enough to interfere with drying for treatment at 190–225°. In some cases it is excessively slow at 250°. The safe temperature can readily be ascertained for any ore. In operation it is a good rule to keep the drying time as short as convenient, and to raise the maximum temperature of the drying gases from time to time until decrease in nickel solubility beyond the desired point gives warning. It is then usually best to decrease the maximum temperature of the drying gases a few degrees and thereafter hold them steady. Economy in drier output and heat consumption is served by drying at the highest temperature compatible with the desired yields.

It is usually desirable to drive off, in addition to the hygroscopic water, as much combined water as can be driven off without reducing differential nickel reactivity under the particular operating conditions. With a plant in steady operation, giving satisfactory yields of nickel, it is often desirable to increase the amount of combined water being driven off by small increments until nickel yields start to drop,—usually by increasing the drying temperature, better, if ample drier capacity is available, by increasing drying time as by increasing depth of ore bed on drier belt or grate and slowing down its speed.

*Ores containing calcium and magnesium carbonates*

Most lateritic ores contain only traces of calcium and magnesium as carbonates or indeed in any other form. Some ores are intermediate between laterites and the garnierites or typical nickel silicate ores common in New Caledonia. These garnierites usually contain much calcium and magnesium as carbonates or in other forms readily attacked by hydrochloric acid under the conditions of operation prescribed for practising this invention. The full advantages of this invention are not realized with such ores unless the calcium and magnesium chlorides formed are decomposed in known ways.

Ores containing manganese

Manganese is frequently present in lateritic nickel ores, in percentages often around 0.4 to 0.6. It usually behaves like nickel in the chloridizing and chloride-destroying steps, and manganese chloride passes into solution along with nickel chloride when such a manganiferous ore which has been treated by the process is leached. In the calcination of the chlorides obtained by leaching to convert nickel chloride to nickel oxide and HCl-steam gases, manganese chloride when present is also converted to oxide and to HCl-steam gases.

Ores approaching the garnieritic type are often so dense and non-porous as to require fine grinding. Furthermore, such ores are often so rich in nickel that it is more profitable to treat them by known direct smelting methods than by the present process.

Treatment of leach solutions

Illustration has been given of the preparation of pure strong nickel solutions free from iron and cobalt as well as from the products of the precipitants used in conventional separation and precipitation of the metals involved, such as, sodium chloride or calcium chloride, and I have illustrated the production of nickel oxide from such solutions without use of chemicals and with recovery of gaseous mixtures of HCl and $H_2O$ ready for reuse.

I may work up the nickel solutions in other ways, e. g. to prepare nickel sulphate for electroplating. To do this I crystallize out nickel chloride from the strong solution and treat the crystals with sulphuric acid, driving off HCl—$H_2O$ gases of suitable strength for use in chloridizing.

When the ore is low in cobalt or when the presence of cobalt in the nickel product is permissible I may separate iron and aluminum only from the original leach solution. When doing this I first oxidize the iron in the solution to the ferric state and then precipitate it with nickel carbonate or hydroxide prepared from wash liquors, or from a portion of the main solution.

My preferred procedures are particularly advantageous in that they avoid the necessity of introducing sulphur in any form at any stage of the process and thus assist in producing nickel metal and nickel alloys free from that most disadvantageous impurity without utilizing special steps for its elimination.

Ventilating

As for instance, when preparing solutions substantially free from iron, and destroying unwanted chlorides at around 275° C. I ventilate the chloridized ore to drive off residual HCl. This is important, but at higher temperatures in the chloride-destroying operation, it becomes less so; less and less HCl is held in the ore as the final temperature is raised.

Countercurrent operation as bearing on HCl economy

I regard as of great importance my discovery that while gases of a certain maximum strength are required at a given temperature to effect a high percentage chloridizing of nickel, yet work can be accomplished by all weaker strengths of gases, and as correspondingly important the provisions of this invention for chloridizing treatment first with very weak gases,—indeed, mere steam—and then successively with stronger and stronger gases up to the maximum found necessary for the particular conditions—usually over 20–25 volume per cent even at 190–210° C., rarely over 60 volume per cent even at around 250–270°.

Because of the feeding back of dilute gases utilized in the chloride-destroying step, and/or in dilution of excessively strong "make-up" or of recovered HCl, the chloridizing operation is perhaps not strictly counter-current, but I regard it as being included within the meaning of that term.

I also consider very important the provisions made enabling perfection of gas-solid contact in the counterflow, and hence efficient exposure of ore to each progressively increasing strength of gas.

It will be readily appreciated how stationary reactors are interconnected for gas flow, and the gas connectitons changed from time to time, so that counter-current flow conditions are obtained although the ore is stationary. The same comments apply to the interconnections and fluid flow between leaching tanks.

The words "forming the ore into pervious lumps" as used in certain of the claims are intended to include mere screening operations, or crushing and screening operations, which may be applied to ore consolidated, e. g. by natural agencies such as sun-baking, providing the consolidated ore is pervious.

The term "drying" used in certain of the claims is intended to include such preheating as is necessary to bring the ore up to initial chloridizing temperature. This preheating is in general a by-product of the drying operation. In hot climates surface sun-dried ore may need scarcely any drying, being substantially free from hygroscopic moisture. In such case the operation called "drying" next preceding the chloridizing step may be largely for preheating purposes.

I claim:

1. The process of treating lateritic ores for recovery of contained nickel values comprising differentially chloridizing the nickel substantially in the dry way with gaseous HCl as essential chloridizing agent and gaseous $H_2O$ as essential restraining agent in controlled relative concentrations such that chloridization of the nickel values is effected and chloridization of iron present in the ore is largely inhibited, and thereafter separating nickel chloride from the ore.

2. The process of treating lateritic ores for recovery of contained nickel values comprising differentially chloridizing the nickel substantially in the dry way with gaseous HCl as essential chloridizing agent and gaseous $H_2O$ as essential restraining agent in relative concentrations controlled relative to the chloridizing temperature so that chloridization of the nickel values is effected and chloridization of iron present in the ore is largely inhibited, and leaching to produce nickel solutions.

3. The process of treating lateritic ores for recovery of contained nickel values comprising differentially chloridizing the nickel substantially in the dry way with gaseous HCl as essential chloridizing agent and gaseous $H_2O$ as essential restraining agent in relative concentrations controlled relative to the chloridizing temperature, the nickel being chloridized below about 300° C. and at least in substantial part above about 190° C., and separating nickel chloride from the ore.

4. The process of treating lateritic ores for recovery of contained nickel values comprising differentially chloridizing the nickel substantially in the dry way with gaseous HCl as essential chloridizing agent and gaseous H₂O as essential restraining agent in controlled relative concentrations, leaching to produce nickel solutions and working the solutions for metal values and for HCl-containing gases for reuse.

5. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, leaching the chloridized ore to produce nickel solutions and working the solutions for metal values and for HCl-containing gases for reuse.

6. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, leaching the chloridized ore to produce nickel solutions and working the solutions for metal values and for HCl-containing gases for reuse by converting the leached chlorides to oxides at elevated temperatures by the agency of H₂O.

7. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, leaching the chloridized ore to produce nickel solutions and working the solutions for metal values and for HCl-containing gases for reuse by converting the leached chlorides to oxides at elevated temperatures by the agency of H₂O and an oxidizing agent.

8. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying at least one of the chlorides of iron and aluminum that may be present, while protecting NiCl₂ from destruction, leaching to produce nickel solutions and working the solutions for metal values.

9. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying at least one of the chlorides of iron and aluminum that may be present, at temperatures at least in part above around 250° C., while protecting NiCl₂ from destruction, leaching to produce nickel solutions and working the solutions for metal values.

10. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying at least one of the chlorides of iron and aluminum that may be present, at temperatures at least in part above around 250° C. by the agency of gaseous H₂O while protecting NiCl₂ from destruction, leaching to produce nickel solutions and working the solutions for metal values.

11. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying chlorides of iron and aluminum that may be present, at temperatures at least in part above around 250° C. by the agency of gaseous H₂O while protecting NiCl₂ from destruction, leaching to produce nickel solutions and working the solutions for metal values and HCl-containing gases for reuse.

12. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying chlorides of iron and aluminum that may be present, at temperatures at least in part above around 250° C. by the agency of gaseous H₂O and an oxidizing agent while protecting NiCl₂ from destruction, ventilating the ore to remove HCl, leaching to produce nickel solutions substantially free from iron and working the solutions for metal values.

13. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying chlorides of iron and aluminum that may be present, at temperatures at least in part above around 250° C. by the agency of gaseous H₂O and an oxidizing agent while protecting NiCl₂ from destruction, ventilating the ore to remove HCl, leaching to produce nickel solutions substantially free from iron and working the solutions for metal values and HCl-containing gases for reuse.

14. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous H₂O as essential restraining agent in relative concentrations controlled relative to the chloridizing temperature, destroying chlorides of iron and aluminum that may be present, at temperatures at least in part above around 250° C. by the agency of gaseous $H_2O$ and an oxidizing agent while protecting $NiCl_2$ from destruction, ventilating the ore to remove HCl, leaching to produce nickel solutions substantially free from iron and working the solutions for metal values and HCl-containing gases for reuse by converting the leached chlorides to oxides at elevated temperatures by treatment with $H_2O$.

15. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying chlorides of iron and aluminum that may be present, at temperatures at least in part above around 250° C. by the agency of gaseous $H_2O$ and an oxidizing agent while protecting $NiCl_2$ from destruction, leaching to produce nickel solutions and working the solutions for metal values.

16. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying chlorides of iron and aluminum that may be present, at temperatures at least in part above around 250° C. by the agency of gaseous $H_2O$ and an oxidizing agent while protecting $NiCl_2$ from destruction, leaching to produce nickel solutions and working the solutions for metal values and HCl-containing gases for reuse.

17. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying at least one of the chlorides of iron and aluminum that may be present, at temperatures at least in part above around 250° C. by the agency of gaseous $H_2O$ while protecting $NiCl_2$ from destruction, ventilating the ore to remove HCl, leaching to produce nickel solutions and working the solutions for metal values.

18. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying at least one of the chlorides of iron and aluminum that may be present, at temperatures at least in part above around 250° C. by the agency of gaseous $H_2O$ while protecting $NiCl_2$ from destruction, ventilating the ore to remove HCl, leaching to produce nickel solutions and working the solutions for metal values and HCl-containing gases for reuse.

19. The process of treating lateritic ores for recovery of contained nickel values comprising differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying chlorides of iron and aluminum that may be present, at temperatures at least in part above around 250° C. by the agency of gaseous $H_2O$ while protecting $NiCl_2$ from destruction, ventilating the ore to remove HCl, leaching and working the resulting solutions for metal values and HCl-containing gases for reuse by converting the leached chlorides to oxides at elevated temperatures by treatment with $H_2O$.

20. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying chlorides of iron and aluminum that may be present, at temperatures at least in part above around 250° C. by the agency of gaseous $H_2O$ and an oxidizing agent while protecting $NiCl_2$ from destruction, leaching to produce nickel solutions and working the solutions for metal values and HCl-containing gases for reuse.

21. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° with gaseous HCl as essential chloridizing agent and with gaseous $H_2O$ as essential restraining agent in relative concentrations controlled relative to the chloridizing temperature, destroying chlorides of iron and aluminum that may be present, at temperatures at least in part above around 250° C. by the agency of gaseous $H_2O$ while protecting $NiCl_2$ from destruction, ventilating the ore to remove HCl, leaching and working the resulting solutions for metal values and HCl-containing gases for reuse by converting the leached chlorides to oxides at elevated temperatures by treatment with $H_2O$.

22. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous $H_2O$ as essential restraining agent in controlled relative concentrations, and thereafter separating nickel chloride from the ore.

23. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous H₂O as essential restraining agent passed in countercurrent to the ore body, said agents being used in controlled relative concentrations, and thereafter separating nickel chloride from the ore.

24. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous H₂O as essential restraining agent in controlled relative concentrations, said gaseous agents being passed through the interstices of said body, thereafter separating nickel chloride from the ore and leaching to produce nickel solutions.

25. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous H₂O as essential restraining agent in relative concentrations controlled relative to the chloridizing temperature, the nickel being chloridized below about 300° C. and at least in substantial part above about 190° C., and leaching to produce nickel solutions.

26. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous H₂O as essential restraining agent in controlled relative concentrations, thereafter separating nickel chloride from the ore by leaching in counter-current to produce strong nickel solutions.

27. The process of treating lateritic ores for recovery of contained nickel values, comprising forming the ore into pervious roughly like sized lumps, differentially chloridizing the nickel values of said ore by treating a body of said lumps substantially in the dry way with gaseous HCl as essential chloridizing agent and gaseous H₂O as essential restraining agent in relative concentrations controlled relative to the chloridizing temperature, the nickel being chloridized below about 300° C. and at least in substantial part above about 190° C., leaching in counter-current to produce strong nickel solutions, and working the solutions for metal values and for HCl-containing gases for reuse.

28. The process of treating lateritic ores for recovery of contained nickel values, comprising forming the ore into pervious roughly like sized lumps, differentially chloridizing the nickle values of said ore by treating a body of said lumps substantially in the dry way with gaseous HCl as essential chloridizing agent and gaseous H₂O as essential restraining agent in controlled relative concentrations, destroying substantially all of at least one of the chlorides of iron and aluminum that may be present, while protecting nickel chloride from destruction, leaching to produce nickel solutions, and crystallizing the chlorides present in said solutions.

29. The process of treating lateritic ores for recovery of contained nickel values, comprising forming the ore into pervious roughly like sized lumps, differentially chloridizing the nickel values of said ore by treating a body of said lumps in the dry way at temperatures below about 300° C. and at least a substantial part above about 190° C. with gaseous HCl as essential chloridizing agent and with gaseous H₂O as essential restraining agent in relative concentrations controlled relative to the chloridizing temperature, leaching to produce nickel solutions, and crystallizing the chlorides present in said solutions.

30. The process of treating lateritic ores for recovery of contained nickel values, comprising differentially chloridizing the nickel values while retaining the natural nickel reactivity of the ore substantially undiminished, said chloridizing being carried out substantially in the dry way with gaseous HCl as essential chloridizing agent and gaseous H₂O as essential restraining agent in controlled relative concentrations such that chloridization of the nickel values is effected and chloridization of iron present in the ore is largely inhibited, and thereafter separating nickel chloride from the ore.

31. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way with gaseous HCl as essential chloridizing agent and gaseous H₂O as essential restraining agent in relative concentrations controlled relative to the chloridizing temperature so that chloridization of the nickel values is effected and chloridization of iron present in the ore is largely inhibited, and leaching to produce nickel solutions.

32. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way with gaseous HCl as essential chloridizing agent and gaseous H₂O as essential restraining agent in relative concentrations controlled relative to the chloridizing temperature, the nickel being chloridized below about 300° C. and at least in substantial part above about 190° C., and separating nickel chloride from the ore.

33. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° C. with gaseous HCl as essential chloridizing agent and with gaseous H₂O as essential restraining agent in relative concentrations controlled relative to the chloridizing temperature, leaching the chloridized ore to produce nickel solutions and working the solutions for metal values and for HCl-containing gases for reuse.

34. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° C. with gaseous HCl as essential chloridizing agent and with gaseous H2O as essential restraining agent in relative concentrations controlled relative to the chloridizing temperature, leaching the chloridized ore to produce nickel solutions and working the solutions for metal values and for HCl-containing gases for reuse by converting the leached chlorides to oxides at elevated temperatures by the agency of H2O, and, in the case of FeCl2, by the agency of an oxidizing agent as well.

35. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° with gaseous HCl as essential chloridizing agent and with gaseous H2O as essential restraining agent in relative concentrations controlled relative to the chloridizing temperature, destroying at least one of the chlorides of iron and aluminum that may be present, while protecting NiCl2 from destruction, leaching to produce nickel solutions and working the solutions for metal values.

36. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° which gaseous HCl as essential chloridizing agent and with gaseous H2O as essential restraining agent in relative concentrations controlled relative to the chloridizing temperature, destroying chlorides of iron and aluminum that may be present, at temperatures at least in part above around 250° C. by the agency of gaseous H2O while protecting NiCl2 from destruction, leaching to produce nickel solutions and working the solutions for metal values and HCl-containing gases for reuse.

37. The process of treating lateritic ores for recovery of contained nickel values, comprising drying the ore while retaining the natural nickel reactivity of the ore substantially undiminished by control of the drying time and maximum drying temperature, differentially chloridizing the nickel substantially in the dry way at temperatures below about 300° C. and at least in substantial part above about 190° with gaseous HCl as essential chloridizing agent and with gaseous H2O as essential restraining agent in relative concentrations controlled relative to the chloridizing temperature, destroying chlorides of iron and aluminum that may be present, at temperatures at least in part above around 250° C. by the agency of gaseous H2O and an oxidizing agent while protecting NiCl2 from destruction, ventilating the ore to remove HCl, leaching to produce nickel solutions substantially free from iron and working the solutions for metal values and HCl-containing gases for reuse by converting the leached chlorides to oxides at elevated temperatures by treatment with H2O.

38. The process of treating lateritic ores for recovery of contained nickel values, comprising forming the ore into pervious lumps, drying said lumps while maintaining the natural nickel reactivity of the ore substantially undiminished by control of the drying time and maximum drying temperature, differentially chloridizing the nickel values of said ore by treating a body of said lumps of roughly like size substantially in the dry way with gaseous HCl as essential chloridizing agent and gaseous H2O as essential restraining agent in controlled relative concentrations, said gaseous agents being passed systematically through the interstices of said body, and thereafter separating nickel chloride from the ore.

39. The process of treating lateritic ores for recovery of contained nickel values, comprising forming the ore into pervious lumps, drying said lumps while maintaining the natural nickel reactivity of the ore substantially undiminished by control of the drying time and maximum drying temperature, differentially chloridizing the nickel values of said ore by treating a body of said lumps of roughly like size substantially in the dry way at temperatures below about 300° C. and at least in substantial part above about 190° C. with gaseous HCl as essential chloridizing agent and with gaseous H2O as essential restraining agent passed substantially in countercurrent through the ore body, said agents being used in relative concentrations controlled relative to the chloridizing temperature, leaching to produce nickel solutions and working the solutions for metal values.

40. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H2O as essential restraining agent passed in countercurrent through the ore body, said agents being used in relative concentrations controlled relative to the chloridizing temperature, the chloridizing temperature being maintained below about 300° C. and at least in substantial part above about 190° C., leaching the chloridized ore in lump form in countercurrent to produce strong nickel solutions, and working the solutions to recover the metal values.

41. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H2O as essential restraining agent passed in countercurrent through the ore body, said agents being used in relative concentrations controlled relative to the chloridizing temperature, the chloridizing temperature being maintained below about 300° C. and at least in substantial part above about 190° C., leaching the chloridized ore in lump form in countercurrent to produce strong nickel solutions, and working the solutions to recover the metal values.

42. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions and crystallizing the chlorides present in said solutions.

43. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions, and crystallizing the chlorides present in said solutions.

44. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions, separating any iron and cobalt present in said solutions while maintaining high concentration of said solutions and substantially the initial freedom of said solutions from alkali and alkaline earth metal salts, and working the solutions to recover the nickel values.

45. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions, separating any iron present in said solutions while maintaining high concentration of said solutions and substantially the initial freedom of said solutions from alkali and alkaline earth metal salts, and working the solutions to recover the nickel values.

46. The process of treating lateritic ores for recovery of contained nickel values, comprising forming the ore into pervious lumps, drying said lumps while maintaining the natural reactivity of the ore substanitally undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions, separating any iron and cobalt present in said solutions while maintaining high concentration of said solutions and substantially the initial freedom of said solutions from alkali and alkaline earth metal salts, and crystallizing the nickel chloride present in said solutions.

47. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous H₂O as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present while protecting nickel chloride from destruction, leaching the chloridized ore in lump form in countercurrent to produce strong nickel solutions, separating any iron and cobalt present in said solutions while maintaining high concentration of said solutions and substantially the initial freedom of said solutions from alkali and alkaline earth metal salts, crystallizing the nickel chloride present in said solutions, and working the nickel chloride to recover the nickel content and HCl-containing gases for reuse.

48. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous $H_2O$ as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present, at temperatures at least in part above around 250° C., while protecting nickel chloride from destruction, leaching the chloridized ore in countercurrent to produce strong nickel solutions, separating any iron and cobalt present in said solutions while maintaining high concentrations of said solutions and substantially the initial freedom of said solutions from alkali and alkaline earth metal salts, crystallizing the nickel chloride present in said solutions, and working the nickel chloride to recover the nickel content and HCl-containing gases for reuse.

49. The process of treating lateritic ores for recovery of contained nickel values, comprising forming the ore into pervious lumps, drying said lumps while maintaining the natural reactivity of the ore substantially undiminished by control of the drying time and the maximum drying temperature, differentially chloridizing the nickel values of said ore by treating a body of said lumps substantially in the dry way with gaseous HCl as essential chloridizing agent and with gaseous $H_2O$ as essential restraining agent passed in countercurrent through the ore body, said agents being used in relative concentrations controlled relative to the chloridizing temperature, the chloridizing temperature being maintained below about 300° C. and at least in substantial part above about 190° C., destroying at least one of the chlorides of iron and aluminum that may be present, at temperatures at least in part above around 250° C., while protecting nickel chloride from destruction, removing any residual HCl by ventilating the body of lumps, cooling the lumps, leaching the chloridized ore in countercurrent to produce strong nickel solutions, separating any iron and cobalt present in said solutions while maintaining high concentration of said solutions and substantially the initial freedom of said solutions from alkali and alkaline earth metal salts, crystallizing the nickel chloride present in said solutions, and working the nickel chloride to recover the nickel content and HCl-containing gases for reuse.

50. The process of treating lateritic ores for recovery of contained nickel values which comprises bringing a gas mixture consisting in large measure of gaseous HCl and gaseous $H_2O$ into reacting relationship with said ore at a chloridizing temperature and so proportioning the amounts of HCl and $H_2O$ in the gas mixture with respect to each other and to the temperature that chloridization of the nickel values is effected and chloridization of iron present in said ore is largely inhibited.

51. The process of treating lateritic ores for recovery of contained nickel values which comprises bringing a gas mixture consisting in large measure of gaseous HCl and gaseous $H_2O$ into countercurrent reacting relationship with said ore at a chloridizing temperature and so proportioning the amounts of HCl and $H_2O$ in the gas mixture with respect to each other and to the temperature that chloridization of the nickel values is effected and chloridization of iron present in said ore is largely inhibited.

ERNEST W. WESCOTT.